United States Patent
Backhaus et al.

(10) Patent No.: US 10,059,036 B2
(45) Date of Patent: Aug. 28, 2018

(54) IMPREGNATING TOOL AND METHOD OF CONTINUOUSLY IMPREGNATING A REINFORCING FIBER MATERIAL WITH A PLASTICS MATERIAL

(71) Applicant: Airbus Operations GmbH, Hamburg (DE)

(72) Inventors: Sascha Backhaus, Hamburg (DE); Krzysztof Lenartowicz, Stade (DE); Robert Gaitzsch, Leipzig (DE)

(73) Assignee: Airbus Operations GmbH, Hamburg (DE)

( * ) Notice: Subject to any disclaimer, the term of this patent is extended or adjusted under 35 U.S.C. 154(b) by 41 days.

(21) Appl. No.: 15/184,407

(22) Filed: Jun. 16, 2016

(65) Prior Publication Data

US 2016/0361839 A1    Dec. 15, 2016

Related U.S. Application Data

(63) Continuation of application No. PCT/EP2014/078506, filed on Dec. 18, 2014.

(51) Int. Cl.
*B05C 1/04* (2006.01)
*B05D 1/40* (2006.01)
(Continued)

(52) U.S. Cl.
CPC .............. *B29B 15/122* (2013.01); *B05C 1/04* (2013.01); *B05D 1/40* (2013.01); *B29C 70/50* (2013.01);
(Continued)

(58) Field of Classification Search
CPC ......... B29B 15/12; B29B 15/122; B05C 1/04; B05D 1/40; B05D 2504/00; B29C 70/50; B29K 2063/00; B29K 2105/08
(Continued)

(56) References Cited

U.S. PATENT DOCUMENTS

| 4,773,841 A | 9/1988 | Kawatsuji |
| 5,863,332 A | 1/1999 | Foster et al. |

(Continued)

FOREIGN PATENT DOCUMENTS

| AT | 65738 E | 8/1991 |
| AT | 403448 B | 2/1998 |

(Continued)

OTHER PUBLICATIONS

Chinese Office Action, dated Mar. 13, 2017, priority document.
(Continued)

*Primary Examiner* — Alexander M Weddle
(74) *Attorney, Agent, or Firm* — Greer, Burns & Crain Ltd.

(57) ABSTRACT

A tool for impregnating a reinforcing fiber material with plastic comprising a support element supporting face facing and spaced from a cover element covering face. A receiving space, between the supporting and covering faces, is connected to an injection channel for supplying the plastic into the space and comprises an inlet opening for continuously feeding the fiber material into the space, as well as an outlet opening for continuously removing plastic impregnated fiber material. The distance between the supporting and covering faces is constant, perpendicular to a feed direction of the fiber material and parallel to a plane defined by at least one of the supporting and covering faces. The support and cover elements are movable relative to one another such that the distance between the supporting and covering faces in the feed direction is adaptable to a varying thickness of the fiber material fed through the receiving space.

15 Claims, 9 Drawing Sheets

(51) Int. Cl.
  *B29B 15/12* (2006.01)
  *B29C 70/50* (2006.01)
  *B29K 63/00* (2006.01)
  *B29K 105/08* (2006.01)

(52) U.S. Cl.
  CPC ...... *B05D 2504/00* (2013.01); *B29K 2063/00* (2013.01); *B29K 2105/08* (2013.01)

(58) Field of Classification Search
  USPC .............................. 427/8, 369; 156/125, 166
  See application file for complete search history.

(56) References Cited

U.S. PATENT DOCUMENTS

| | | | |
|---|---|---|---|
| 8,123,510 B1* | 2/2012 | Johnson | B29C 70/526 156/245 |
| 2005/0023728 A1 | 2/2005 | Benson et al. | |
| 2005/0044896 A1 | 3/2005 | Frank et al. | |
| 2007/0023572 A1 | 2/2007 | Muller et al. | |
| 2009/0065302 A1* | 3/2009 | Kelly | B29C 70/025 182/194 |
| 2013/0142997 A1 | 6/2013 | Hofmann et al. | |

FOREIGN PATENT DOCUMENTS

| | | |
|---|---|---|
| CN | 1829595 | 9/2006 |
| CN | 1860081 | 11/2006 |
| CN | 100418850 | 1/2007 |
| CN | 102933379 | 2/2013 |
| DE | 3750924 | 5/1995 |
| DE | 102004001078 | 7/2005 |
| DE | 102007062111 | 7/2009 |
| DE | 102010007491 | 8/2011 |
| EP | 0712716 | 5/1996 |
| EP | 1819503 | 8/2007 |

OTHER PUBLICATIONS

International Search Report, dated Mar. 4, 2015, Priority Document.
German Search Report, dated Aug. 4, 2014, priority document.

* cited by examiner

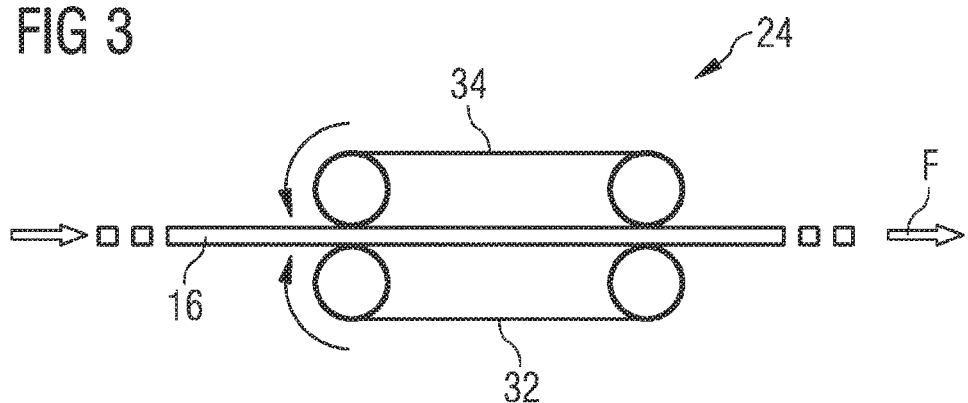
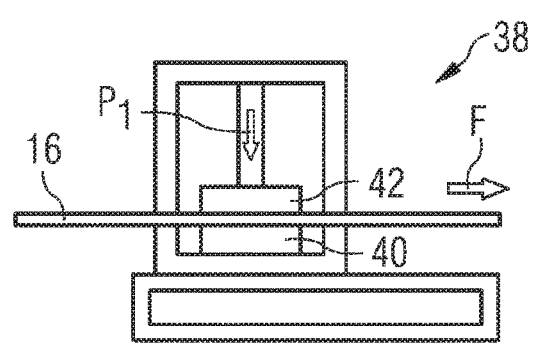
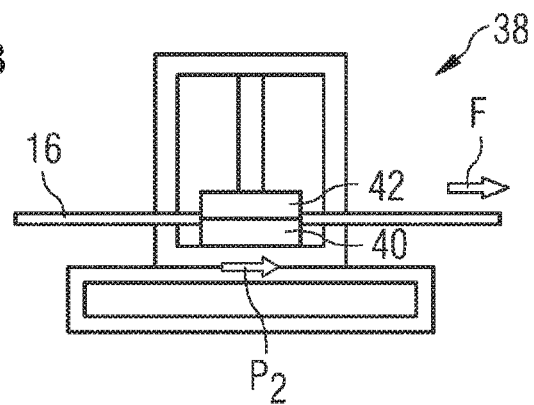

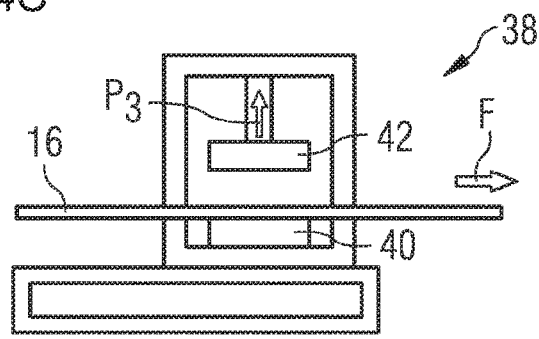
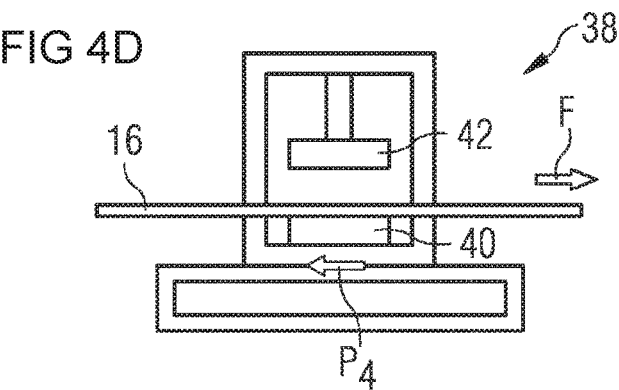

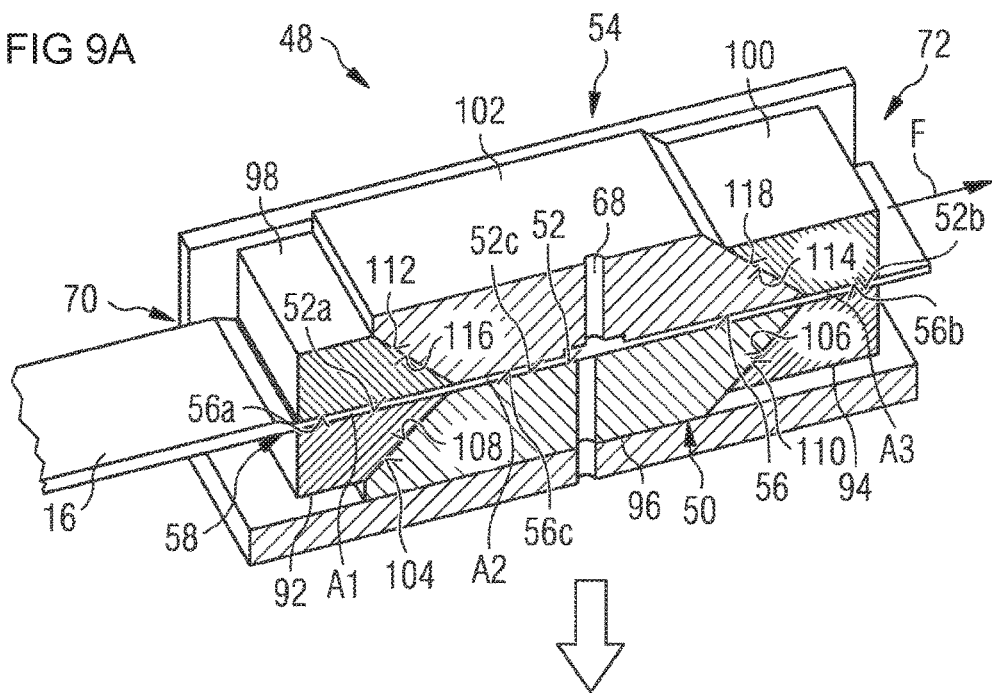
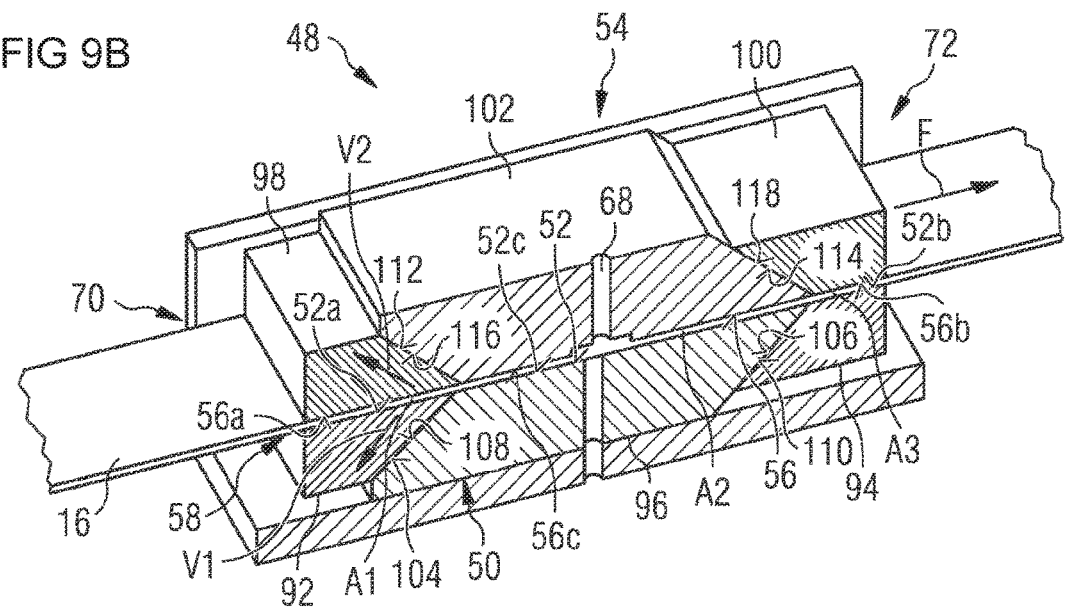

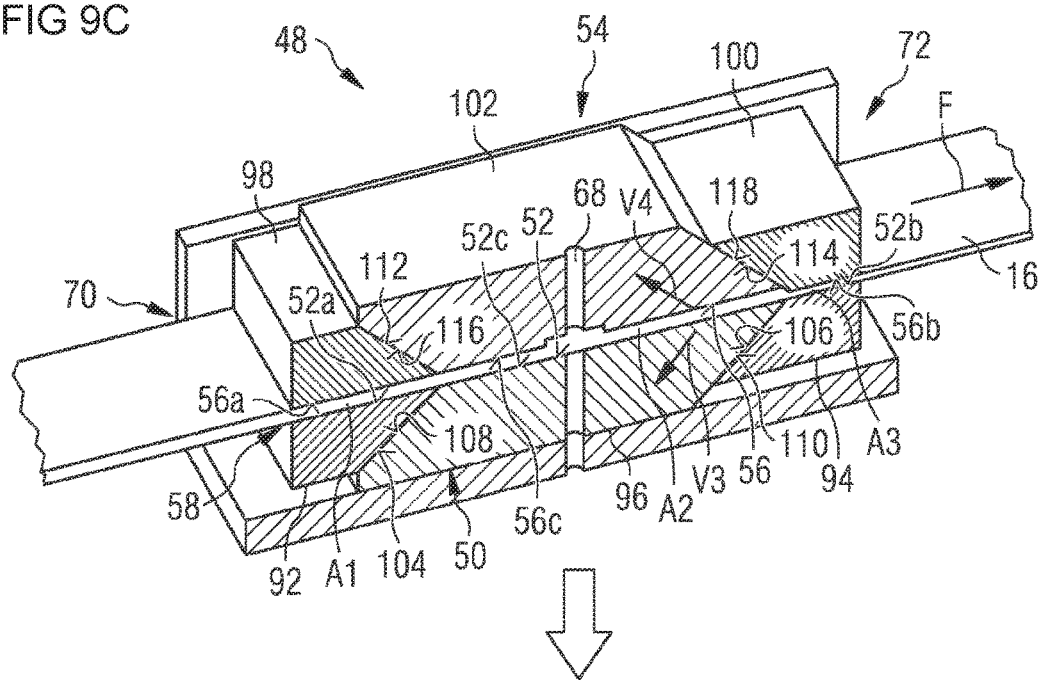

IMPREGNATING TOOL AND METHOD OF CONTINUOUSLY IMPREGNATING A REINFORCING FIBER MATERIAL WITH A PLASTICS MATERIAL

CROSS-REFERENCES TO RELATED APPLICATIONS

This application is a continuation of International Application PCT/EP2014/078506 filed Dec. 18, 2014, designating the United States and published on Jun. 25, 2015 as WO 2015/091825. This application also claims the benefit of the German patent application No. 10 2013 226 730.4 filed on Dec. 19, 2013. The entire disclosures of the above are incorporated herein by way of reference.

BACKGROUND OF THE INVENTION

The invention relates to an impregnating tool and a method of impregnating a reinforcing fiber material with a plastics material in a continuous process. The invention further relates to an apparatus for continuously manufacturing components, in particular, aircraft structural components, from fiber reinforced composite materials.

In aircraft construction, efforts are being made increasingly to use, as load-bearing components, components that are made entirely or partially of fiber reinforced composite materials, for example carbon fiber reinforced plastics (CRP). For example, DE 10 2007 062 111 A1 describes a crosspiece structure made of carbon fiber reinforced plastics material that is used to support the individual panels of an aircraft floor system for separating a passenger cabin from a cargo area disposed underneath the passenger cabin. It is further known, for example, from DE 10 2004 001 078 A1 and/or CN 100418850 to provide aircraft fuselage segments with a skin and reinforcing elements (for example frames, stringers) made of fiber reinforced composite materials.

When manufacturing aircraft structural components from fiber reinforced composite materials, first a multi-layer laminate is constructed from fiber prepregs. The fiber prepregs may comprise a woven or non-woven fabric made of reinforcing fibers, which are provided with a surface layer of an uncured plastics material, for example, an epoxy resin material. The laminate construction may be effected manually or in an automated manner. The fiber prepregs may then be brought into a desired shape of a planar portion forming an aircraft skin or of a reinforcing portion forming a frame or stringer. Finally, the plastics material applied onto the surfaces of the fibers is cured under pressure and/or raised temperature in an autoclave cycle, thereby producing a composite material having a matrix of a cured plastics material and reinforcing fibers embedded in the matrix. An autoclave process lends itself particularly well to the individual manufacture of components, even of a complex shape.

In contrast to this, EP 1 819 503 B1 describes a method of continuously manufacturing structural profiles that are suitable for use as aircraft structural components. In this method, first a multi-layer fiber layer structure is produced. For this purpose, dry fiber layers are unwound from appropriate rollers and supplied to a pre-forming tool that brings the fiber layers under pressure into a desired preliminary shape. The pre-formed fiber layer stack produced in the pre-forming tool is impregnated with a mixture of an epoxy resin and a hardening agent, in which, by supplying heat, a partial reaction that brings about a reduction of the viscosity of the resin is induced. In an intermittent press the resin-impregnated fiber layer stack is then heated further and put under pressure so that the resin gels and the crosslinking progresses to the point of dimensional stability. The complete curing of the resin is finally effected in a drying tunnel.

Throughout the process the fiber layers, the fiber layer stack and/or the resin-impregnated fiber layer stack are conveyed by means of appropriate take-off devices continuously to, and through, the individual stations of the process. The intermittent press is mounted movably so that over a specific section it may be moved jointly with the resin-impregnated fiber layer stack that is to be pressed. As soon as the treatment of a portion of the resin-impregnated fiber layer stack in the intermittent press has been completed, the intermittent press is opened and moved counter to the direction of motion of the resin-impregnated fiber layer stack until it reaches an appropriate position, in which the intermittent press may be closed again in order to treat a further portion of the resin-impregnated fiber layer stack. The continuous method described in EP 1 819 503 B1 is suitable for the large-scale manufacture of structural profiles with a constant cross section.

SUMMARY OF THE INVENTION

The invention is directed at an object of indicating an impregnating tool and a method that make it possible to impregnate a reinforcing fiber material of varying thickness with a plastics material in a continuous process. The invention is further directed at an object of indicating an apparatus that enables a continuous manufacture of components, in particular, aircraft structural components, of varying thickness from fiber reinforced composite materials.

An impregnating tool for impregnating a reinforcing fiber material with a plastics material comprises a support element, which comprises a supporting face. A cover element is further provided which comprises a covering face that faces the supporting face of the support element and is disposed at a distance from the supporting face of the support element. Finally, the impregnating tool comprises a receiving space which is delimited by the supporting face of the support element and the covering face of the cover element and is connected to an injection channel for supplying the plastics material into the receiving space.

Through the injection channel there may be supplied to the receiving space of the impregnating tool a plastics material that is capable of forming in a structural component, in particular an aircraft structural component, a matrix, in which the reinforcing fibers of the reinforcing fiber material are embedded. The plastics material may be a thermoplastic polymer material or a crosslinking plastics material, in particular a resin, preferably an epoxy resin. The reinforcing fiber material may contain reinforcing fibers in the form of individual fibers or in the form of a fibrous non-woven or woven fabric. Preferably, the reinforcing fiber material is present in the form of a continuous strand and is consequently capable of being processed into elongate structural profiles, for example into frames, stringers or the like that are usable as primary structural components in an aircraft.

The impregnating tool is suitable for use in a continuous impregnating process. For this purpose, the receiving space of the impregnating tool is provided with an inlet opening for supplying the reinforcing fiber material into the receiving space in a continuous process, and with an outlet opening for removing reinforcing fiber material impregnated with the plastics material from the receiving space in a continuous process. The reinforcing fiber material may be conveyed at a constant or varying speed through the receiving space of the impregnating tool. It is, however, also conceivable to convey the reinforcing material intermittently and/or with conveying pauses through the receiving space of the impregnating tool, wherein conveying interruptions may be utilized, for example, to inject the plastics material into the receiving space and/or to arrange already a partial curing of the plastics material.

The distance between the supporting face of the support element and the covering face of the cover element is constant in a direction perpendicular to a feed direction of the reinforcing fiber material through the receiving space and parallel to a plane defined by the supporting face and/or the covering face. In other words, in a direction perpendicular to the feed direction of the reinforcing fiber material through the receiving space and parallel to a plane defined by the supporting face and/or the covering face, neither the supporting face of the support element nor the covering face of the cover element is provided with steps, inclinations or other geometric elements that would result in a change of the distance between the supporting face and the covering face.

In contrast thereto, the supporting face of the support element and/or the covering face of the cover element in the feed direction of the reinforcing fiber material through the receiving space may absolutely have a step or an undulating shape, which in the feed direction of the reinforcing fiber material through the receiving space leads to a variation of the distance between the supporting face and the covering face. For example, an undulating shape of the supporting face and/or of the covering face may be utilized, during feeding through the receiving space of a reinforcing fiber material that is to be impregnated, to achieve a dynamic pressure variation and hence better impregnating properties.

The support element and the cover element are moreover movable in such a manner relative to one another that the distance between the supporting face of the support element and the covering face of the cover element in the feed direction of the reinforcing fiber material through the receiving space is adaptable to a varying thickness of the reinforcing fiber material fed in a continuous process through the receiving space. Here, by the term "thickness" is meant the extent of the reinforcing fiber material in a direction perpendicular to a plane defined by the two-dimensional reinforcing fiber material, wherein the thickness of the reinforcing fiber material may vary continuously or intermittently. For example, a thickness variation of the reinforcing fiber material may result from a variation of the number or type of reinforcing fiber woven fabric layers, from which the reinforcing fiber material may be constructed.

The support element may be rigidly fixed and the cover element may be movable relative to the support element in order to vary the distance between the supporting face of the support element and the covering face of the cover element in a desired manner. Alternatively, it is also conceivable to provide the impregnating tool with a rigidly fixed cover element and with a support element that is movable relative to the cover element. Finally, both the support element and the cover element may be movably mounted, with the result that both elements are movable between various positions in order to adapt the distance between the supporting face of the support element and the covering face of the cover element.

The relative movement between the support element and the cover element may be realized by means of a suitable drive device, for example an electric motor, a hydraulic system or a pneumatic system, if desired, under the control of a control unit. Alternatively, however, it is also conceivable to provide a passive device for adapting the distance between the supporting face of the support element and the covering face of the cover element to a varying thickness of the reinforcing fiber material fed in a continuous process through the receiving space. Such a passive device may comprise, for example, a spring element for spring-mounting the support element and/or the cover element. The spring element may then preload the support element and/or the cover element into a position, in which the supporting face of the support element and the covering face of the cover element have a minimum distance from one another. If there is then supplied to the receiving space reinforcing fiber material, which has a thickness that is greater than the minimum distance between the supporting face of the support element and the covering face of the cover element, the support element and the cover element, because of the interacting of the reinforcing fiber material with the supporting face of the support element and the covering face of the cover element, are pressed apart counter to the spring action of the spring element so that the distance between the supporting face of the support element and the covering face of the cover element increases in accordance with the thickness of the reinforcing fiber material. If the thickness of the reinforcing fiber material then decreases, the spring element ensures that the support element and the cover element are moved back towards one another, thereby decreasing the distance between the supporting face of the support element and the covering face of the cover element.

By virtue of the adaptation of the distance between the supporting face and the covering face to the thickness of the reinforcing fiber material fed through the receiving space it is possible to prevent reinforcing fiber material from being fed through a receiving space that is too narrow for the thickness of the reinforcing fiber material. Excessively high frictional forces between the surfaces of the reinforcing fiber material and the supporting face and/or the covering face as well as damage to the reinforcing fiber material resulting therefrom may therefore be reliably prevented. Furthermore, by virtue of the adaptation of the distance between the supporting face and the covering face to the thickness of the reinforcing fiber material it is possible to minimize leakages of plastics material from the receiving space of the impregnating tool that may result from a design of the impregnating tool, whereby the distance between the supporting face and the covering face are adapted rigidly to a maximum thickness of the reinforcing fiber material and consequently a gap arises between the reinforcing fiber material and the covering face if a portion of the reinforcing fiber material that has a thickness smaller than the maximum thickness is conveyed through the receiving space of the impregnating tool.

Furthermore, the arrangement of the supporting face and the covering face at a distance, which is constant in a direction perpendicular to the feed direction of the reinforcing fiber material through the receiving space and parallel to a plane defined by the supporting face and/or the covering face, upon a relative movement of the support element and the cover element enables, if need be, a decrease or increase of the distance between the supporting face and the covering face that is uniform over the entire receiving space. Thus, by means of the impregnating tool it is possible to process in a continuous injection process reinforcing fiber materials, the thickness of which varies to a greater extent in the feed direction of the reinforcing fiber material and which therefore could previously be impregnated with plastics material only by using an impregnating bath method. Finally, the impregnating tool is universally usable for the continuous manufacture of various profile geometries, such as, for example, U-, omega- or T-sections, since the impregnation precedes the shaping of the sections.

The receiving space of the impregnating tool in a direction perpendicular to the feed direction of the reinforcing fiber material through the receiving space may be delimited by lateral faces that may be formed on the support element and/or the cover element. For example, the receiving space may be delimited by two lateral faces formed on the support element or by two lateral faces formed on the cover element. Alternatively, conceivable however is a configuration, in which the receiving space of the impregnating tool is delimited by a lateral face formed on the support element and by a lateral face formed on the cover element. The lateral faces may be disposed parallel to one another. In addition, or alternatively thereto the supporting face and the covering face at least in specific operating phases of the impregnating tool may be oriented parallel to one another. The lateral faces may extend substantially perpendicular to the supporting face and/or the covering face.

In a preferred embodiment of the impregnating tool, the support element and the cover element in a direction perpendicular to the feed direction of the reinforcing fiber material through the receiving space and perpendicular to a plane defined by the supporting face and/or the covering face, are movable relative to one another in order to adapt the distance between the supporting face of the support element and the covering face of the cover element to a varying thickness of the reinforcing fiber material fed in a continuous process through the receiving space. Such a development of the impregnating tool is advantageous, particularly if the cover element is of a plate-shaped construction and is accommodated between lateral walls formed on the support element, or if the support element is of a plate-shaped construction and is accommodated between lateral walls formed on the cover element. The impregnating tool then has a simple geometry and a simple structure.

In addition or alternatively thereto, the support element and the cover element may be pivotable relative to one another about an axis, which extends perpendicular to the feed direction of the reinforcing fiber material and parallel to a plane defined by the supporting face and/or the covering face, in order to adapt the distance between the supporting face of the support element and the covering face of the cover element to a varying thickness of the reinforcing fiber material fed in a continuous process through the receiving space. Given such a development of the impregnating tool, the supporting face and the covering face may be oriented parallel to one another so long as reinforcing fiber material of a constant thickness is being fed through the receiving space. If, on the other hand, the thickness of the reinforcing fiber material to be supplied to the receiving space increases, by pivoting the support element and the cover element relative to one another, the distance between the supporting face and the covering face in the region of the inlet opening of the receiving space may be increased, while the distance between the supporting face and the covering face in the region of the outlet opening of the receiving space is decreased.

Consequently, the thicker reinforcing fiber material may be supplied into the receiving space, while in the region of the outlet opening of the receiving space a leakage of plastics material from the receiving space may be prevented. In principle, the axis, about which the support element and the cover element are pivotable relative to one another, may be a fixed axis. Given such a development of the impregnating tool, the distance between the supporting face and the covering face should then be greater than the thickness of the reinforcing fiber material fed through the receiving space in order during the pivoting of the support element and/or the cover element in the region of the inlet opening or the outlet opening of the receiving space to prevent the reinforcing fiber material from becoming jammed between the supporting face and the covering face and hence possibly becoming damaged. The axis, about which the support element and the cover element are pivotable relative to one another, may however alternatively be a virtual, non-fixed axis. Given such a variant of the impregnating tool, for example, the distance between the supporting face and the covering face in the region of the inlet opening may be varied and the distance between the supporting face and the covering face may be held constant, or vice versa.

In principle, both the support element and the cover element may be pivotably mounted. Preferably, however, the support element is configured as a rigidly fixed support element and the cover element is pivotable relative to the support element. The swiveling movement of the support element and/or of the cover element may be realized by means of a suitable drive device, such as, for example, an electric motor with a drive spindle, a hydraulic system or a pneumatic system. For example, the cover element may be mounted pivotably relative to the support element by means of a plurality of hydraulic pistons, for example four. Preferably the drive device that may initiate a swiveling movement of the support element and the cover element relative to one another is also configured such as to move the support element and the cover element relative to one another perpendicular to the feed direction of the reinforcing fiber material in order to adapt the distance between the supporting face and the covering face to a varying thickness of the reinforcing fiber material.

On the support element at least one contact face may be formed which, along the feed direction of the reinforcing fiber material through the receiving space, is inclined relative to the supporting face and interacts with a complementary contact face formed on the cover element. The support element and the cover element are then preferably movable relative to one another in a direction parallel to the contact faces in order to adapt the distance between the supporting face of the support element and the covering face of the cover element to a varying thickness of the reinforcing fiber material fed in a continuous process through the receiving space. A relative displacement of the support element and the cover element along inclined contact faces enables an infinitely variable adjustment of the distance between the supporting face and the covering face without the use of complex mechanical or electrical drive means.

The contact face formed on the support element may form with the supporting face an angle of inclination, which corresponds to an angle of inclination that the contact face formed on the cover element forms with the covering face. Given such a development of the impregnating tool, the supporting face and the covering face may always be kept parallel to one another even if the distance between the supporting face and the covering face is varied as a result of a relative displacement of the support element and the cover element along the inclined contact faces.

The contact face formed on the support element may be disposed in a region, facing the cover element, of a lateral wall of the support element and may interact with a contact face, which is formed on the cover element and disposed in a region, facing the support element, of a recess. The recess may be provided in an outer face of the cover element. Alternatively, or in addition thereto, the contact face formed on the cover element may be disposed in a region, facing the support element, of a lateral wall of the cover element and may interact with a contact face, which is formed on the support element and disposed in a region, facing the cover element, of a recess. The recess may then be provided in an outer face of the support element.

In the region of the inlet opening of the receiving space preferably at least one sealing element is provided, which is configured to effect sealing of a gap between the reinforcing fiber material, which is being supplied to the receiving space through the inlet opening, and the support element and/or the cover element. In addition, or alternatively thereto, in the region of the outlet opening of the receiving space at least one sealing element may be provided, which is configured to effect sealing of a gap between the reinforcing fiber material impregnated with the plastics material, which is removed from the receiving space through the outlet opening, and the support element and/or the cover element. Sealing elements disposed in the region of the inlet opening and/or the outlet opening may effectively prevent an escape of plastics material from the receiving space of the impregnating tool. The provision of sealing elements is advantageous particularly when in the region of the inlet opening and/or the outlet opening the distance between the supporting face and the covering face is greater than the thickness of the reinforcing fiber material that is fed through the inlet opening and/or of the reinforcing fiber material impregnated with the plastics material that is fed through the outlet opening.

In addition, or alternatively thereto, the impregnating tool may comprise a heating device and/or a cooling device for heating or cooling the reinforcing fiber material impregnated with the plastics material. As a result of heating or cooling the viscosity of the plastics material may be controlled. Furthermore, by a purposeful addition of heat the partial or complete curing of the plastics material may be initiated. The heating device and/or the cooling device are provided in particular in the region of the inlet opening and/or the outlet opening of the receiving space. For example, by supplying cooling energy into the receiving space in the region of the inlet opening the viscosity of the plastics material may be raised and hence the leakage of plastics material from the inlet opening may be minimized. Correspondingly, by supplying thermal energy in the region of the outlet opening a partial curing of the plastics material may be effected and hence the leakage of plastics material from the outlet opening may be minimized. As a heating device, for example, an electrical resistance heating device may be used. Alternatively, or in addition thereto, a heating and/or cooling device may comprise fluid channels, through which a cooling- or heating fluid may flow.

In a preferred embodiment of the impregnating tool the support element comprises at least one support-element sealing portion, which is disposed in the region of the inlet opening and/or the outlet opening of the receiving space, as well as a support-element central portion. On each support-element sealing portion a supporting-face end portion may be formed, which delimits the receiving space in the region of the inlet opening and/or the outlet opening. On the support-element central portion a supporting-face central portion may be formed. Preferably the support-element sealing portion and the support-element central portion are movable in such a way relative to one another that between the supporting-face end portion, which is formed on the support-element sealing portion, and the covering face a first distance is adjustable, which is adaptable to a varying thickness of the reinforcing fiber material fed in a continuous process through the receiving space. The first distance differs preferably from a second distance between the supporting-face central portion and the covering face that is adapted to a varying thickness of the reinforcing fiber material fed in a continuous process through the receiving space.

Such a development of the impregnating tool therefore makes it possible to adjust a larger or smaller distance between the supporting face and the covering space in the region of the inlet opening and/or the outlet opening of the receiving space than in a central region of the receiving space. The geometry of the impregnating tool is therefore adaptable particularly well to the geometry of a reinforcing fiber material of varying thickness that is fed through the receiving space. For example, the distance between the supporting face and the covering face in the region of the inlet opening and/or the outlet opening of the receiving space may be smaller than in the region of the support-element central portion, namely, for example, when there is being fed through the inlet opening and/or the outlet opening a portion of the reinforcing fiber material that has a smaller thickness than a portion that is just being fed through a central region of the receiving space. Thus, the leakage of plastics material from the inlet opening and/or the outlet opening of the receiving space may be minimized.

In addition, or alternatively thereto, the cover element may comprise at least one cover-element sealing portion, which is disposed in the region of the inlet opening and/or the outlet opening of the receiving space, as well as a cover-element central portion. On each cover-element sealing portion a covering-face end portion may be formed, which delimits the receiving space in the region of the inlet opening and/or outlet opening. On the cover-element central portion a covering-face central portion may be formed. The cover-element sealing portion and the cover-element central portion are preferably movable in such a way relative to one another that between the covering-face end portion, which is formed on the cover-element sealing portion, and the supporting face a first distance is adjustable, which is adapted to a varying thickness of the reinforcing fiber material fed in a continuous process through the receiving space. The first portion may differ from a second distance between the covering-face central portion and the supporting face that is adapted to a varying thickness of the reinforcing fiber material fed in a continuous process through the receiving space.

On the support-element sealing portion a support-element guiding face may be formed, which along the feed direction of the reinforcing fiber material through the receiving space is inclined relative to the supporting-face end portion formed on the support-element sealing portion. The support-element guiding face formed on the support-element sealing portion may interact with a complementary support-element guiding face formed on the support-element central portion. In particular, the support-element sealing portion and the support-element central portion are movable relative to one another in a direction parallel to the support-element guiding faces in order to vary the first distance between the supporting-face end portion formed on the support-element sealing portion and the covering face relative to the second distance between the supporting-face central portion and the covering face.

In a similar manner, on the cover-element sealing portion a cover-element guiding face may be formed, which along the feed direction of the reinforcing fiber material through the receiving space is inclined relative to the covering-face end portion formed on the cover-element sealing portion and interacts with a complementary cover-element guiding face formed on the cover-element central portion. The cover-element sealing portion and the cover-element central portion may be movable relative to one another in a direction parallel to the cover-face guiding faces in order to vary the first distance between the covering-face end portion formed on the cover-element sealing portion and the supporting face relative to the second distance between the covering-face central portion and the supporting face.

Support-element guiding faces formed on the support-element sealing portion and the support-element central portion may form with the supporting face an angle of inclination, which corresponds to an angle of inclination that cover-element guiding faces formed on the cover-element sealing portion and the cover-element central portion form with the covering face. By virtue of such a configuration of the impregnating tool it may be guaranteed that portions of the supporting face and the covering face that are oriented parallel to one another remain aligned parallel to one another even in the event of a variation of the distance between these planar portions.

In a method of impregnating a reinforcing fiber material with a plastics material an impregnating tool is provided, which comprises a support element having a supporting face, a cover element having a covering face, which faces the supporting face of the support element and is disposed at a distance from the supporting face of the support element, and a receiving space, which is delimited by the supporting face of the support element and the covering face of the cover element. The reinforcing fiber material is supplied into the receiving space through an inlet opening of the receiving space in a continuous process. The plastics material is supplied into the receiving space through an injection channel connected to the receiving space. Reinforcing fiber material impregnated with the plastics material is removed from the receiving space through an outlet opening of the receiving space in a continuous process. The distance between the supporting face of the support element and the covering face of the cover element is constant in a direction perpendicular to a feed direction of the reinforcing fiber material through the receiving space and parallel to a plane defined by the supporting face and/or the covering face. The support element and the cover element are moved in such a way relative to one another that the distance between the supporting face of the support element and the covering face of the cover element in the feed direction of the reinforcing fiber material through the receiving space is adapted to a varying thickness of the reinforcing fiber material fed in a continuous process through the receiving space.

The support element and the cover element are preferably moved relative to one another in a direction perpendicular to the feed direction of the reinforcing fiber material through the receiving space perpendicular to a plane defined by the supporting face and/or the covering face in order to adapt the distance between the supporting face of the support element and the covering face of the cover element to a varying thickness of the reinforcing fiber material fed in a continuous process through the receiving space.

The support element and the cover element may be pivoted relative to one another about an axis, which extends perpendicular to the feed direction of the reinforcing fiber material through the receiving space and parallel to a plane defined by the supporting face and/or the covering face, in order to adapt the distance between the supporting face of the support element and the covering face of the cover element to a varying thickness of the reinforcing fiber material fed in a continuous process through the receiving space. The axis may be a fixed axis, but alternatively a virtual, non-fixed axis.

On the support element at least one contact face may be formed, which along the feed direction of the reinforcing fiber material through the receiving space is inclined relative to the supporting face and interacts with a complementary contact face formed on the cover element. The support element and the cover element may be moved relative to one another in a direction parallel to the contact faces in order to adapt the distance between the supporting face of the support element and the covering face of the cover element to a varying thickness of the reinforcing fiber material fed in a continuous process through the receiving space.

The support element may comprise at least one support-element sealing portion, which is disposed in the region of the inlet opening and/or the outlet opening of the receiving space, as well as a support-element central portion, wherein on each support-element sealing portion a supporting-face end portion may be formed, which delimits the receiving space in the region of the inlet opening and/or the outlet opening. On the support-element central portion a supporting-face central portion may be formed. The support-element sealing portion and the support-element central portion may be moved in such a way relative to one another that between the supporting-face end portion formed on the support-element sealing portion and the covering face a first distance is adjusted, which is adapted to a varying thickness of the reinforcing fiber material fed in a continuous process through the receiving space and which differs from a second distance between the supporting-face central portion and the covering face that is adapted to a varying thickness of the reinforcing fiber material fed in a continuous process through the receiving space.

Alternatively, or in addition thereto the cover element may comprise at least one cover-element sealing portion, which is disposed in the region of the inlet opening and/or the outlet opening of the receiving space, as well as a cover-element central portion, wherein on each cover-element sealing portion a covering-face end portion may be formed, which delimits the receiving space in the region of the inlet opening and/or the outlet opening. On the cover-element central portion a covering-face central portion may be formed. The cover-element sealing portion and the cover-element central portion may be moved in such a way relative to one another that between the covering-face end portion formed on the cover-element sealing portion and the supporting face a first distance is adjusted, which is adapted to a varying thickness of the reinforcing fiber material fed in a continuous process through the receiving space and which differs from a second distance between the covering-face central portion and the supporting face that is adapted to a varying thickness of the reinforcing fiber material fed in a continuous process through the receiving space.

On the support-element sealing portion a support-element guiding face may be formed, which along the feed direction of the reinforcing fiber material through the receiving space is inclined relative to the supporting-face end portion formed on the support-element sealing portion and interacts with a complementary support-element guiding face formed on the support-element central portion. The support-element sealing portion and the support-element central portion may be moved relative to one another in a direction parallel to the support-element guiding faces in order to vary the first distance between the supporting-face end portion formed on the support-element sealing portion and the covering face relative to the second distance between the supporting-face central portion and the covering face.

On the cover-element sealing portion a cover-element guiding face may be formed, which along the feed direction of the reinforcing fiber material through the receiving space is inclined relative to the covering-face end portion formed on the cover-element sealing portion and interacts with a complementary cover-element guiding face formed on the cover-element central portion, wherein the cover-element sealing portion and the cover-element central portion may be moved relative to one another in a direction parallel to the cover-element guiding faces in order to vary the first distance between the covering-face end portion formed on the cover-element sealing portion and the supporting face relative to the second distance between the covering-face central portion and the supporting face.

An apparatus for continuously manufacturing components from fiber reinforced composite materials comprises a feed device, which is configured to feed a semi-finished product containing reinforcing fibers through the apparatus. The apparatus is further equipped with an impregnating device, which comprises an impregnating tool as described above.

BRIEF DESCRIPTION OF THE DRAWINGS

There now follows a detailed description of preferred embodiments of the invention with reference to the accompanying schematic drawings:

FIG. 3 shows an alternative variant of a feed device, which may be used in an apparatus for continuously manufacturing components from fiber reinforced composite materials according to FIG. 1, FIGS. 4A to D show detail representations of a shaping device, which is usable in the apparatus according to FIG. 1.

DETAILED DESCRIPTION OF THE PREFERRED EMBODIMENTS

Figure 1:
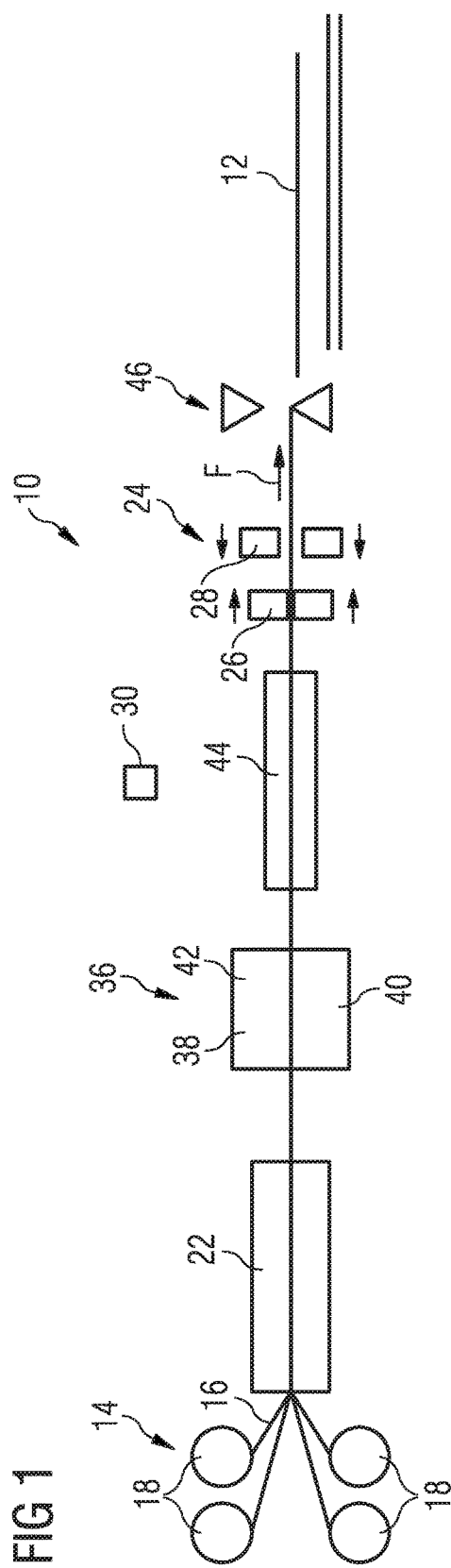
FIG. 1 shows an overview representation of an apparatus for continuously manufacturing components from fiber reinforced composite materials.

FIG. 1 shows an apparatus 10 for continuously manufacturing components 12 from fiber reinforced composite materials. The apparatus 10 comprises a supply device 14 for supplying a reinforcing fiber material 16. In particular, the supply device 14 comprises a plurality of rollers 18, onto each of which a continuous strand of the reinforcing fiber material 16 is wound. The reinforcing fiber material 16 is a dry reinforcing fiber woven fabric, the reinforcing fibers of which are not impregnated with a plastics material. The reinforcing fiber woven fabric wound onto the individual rollers 18 may differ from one another in terms of the type and orientation of the reinforcing fibers contained in the woven fabric. In particular, the reinforcing fibers may be oriented unidirectionally, bidirectionally or in any desired manner in the individual reinforcing fiber woven fabrics. Furthermore, a semi-finished product comprising the reinforcing fiber material 16 may comprise, in addition to reinforcing fibers, further components that influence the material properties, such as, for example, binding threads, impact resistance modifiers, binder particles, surface materials, such as, for example, peel ply for subsequent surface activation, general functional elements, such as, for example, electric or optical lines or the like.

The reinforcing fiber woven fabric layers unwound from the rollers 18 are stacked on top of one another in a sequence that is dependent, for example, upon the desired mechanical properties of the structural component 12 that is to be manufactured. In particular reinforcing fiber woven fabrics of differing fiber orientations may be stacked on top of one another in order purposefully to control the mechanical properties of the structural component 12 to be manufactured. The rollers 18 of the supply device 14 may comprise an alignment apparatus for aligning the rollers along their axes of rotation (not shown in FIG. 1). The alignment apparatus may comprise a detection device, for example, in the form of a light barrier or the like, which preferably continuously detects a position on the roller 18 of the reinforcing fiber woven fabric wound onto the roller 18. In dependence upon the measurement results provided by the detection device a corresponding control device may then effect a displacement of the position of the rollers 18 along their axis of rotation so that the reinforcing fiber woven fabric layers unwound from the rollers 18 may be disposed precisely one above the other as they are unwound from the rollers 18. The rollers 18 may be displaced along their axis of rotation, for example, by means of an electric motor and a spindle drive. By virtue of such a development of the supply device 14 the formation of creases in the individual reinforcing fiber woven fabric layers may be prevented or at least markedly reduced.

The supply device may further comprise a guiding- and/or smoothing apparatus, which comprises rollers or sliding blocks and which guides and smoothes the reinforcing fiber woven fabric layers unwound from the individual rollers of the supply device while they are stacked one on top of the other (not shown in FIG. 1). If desired, a heating device (likewise not shown in FIG. 1) may further be provided, which is used to activate a binding agent contained in the reinforcing fiber woven fabric layers, for example a thermoplastic binder, in order to bond together the reinforcing fiber woven fabric layers that are stacked on top of one another. The heating device may comprise, for example, a heat source in the form of an infrared radiator or some other suitable heat source.

The reinforcing woven fabric layer stack is supplied to an impregnating device 22. In the impregnating device 22 the reinforcing fibers of the reinforcing fiber woven fabric are impregnated with a plastics material, in particular with a crosslinking plastics material, such as, for example, a resin, in the manner that is described in greater detail below.

The reinforcing fiber material 16 is fed through the apparatus 10 by means of a feed device 24. The feed device 24 shown in detail in FIG. 2 comprises a first and a second clamping apparatus 26, 28, which are each adjustable between an open position, in which they release the reinforcing fiber material 16, and a closed position, in which they clamp the reinforcing fiber material 16 tightly between two clamping jaws 26a, 26b, 28a, 28b. The clamping apparatuses 26, 28 are moreover movable, as indicated by the arrows PK1, PK2 in FIG. 2, in a feed direction F of the reinforcing fiber material 16 or counter to the feed direction F of the reinforcing fiber material 16 through the apparatus 10 between a clamping position and a release position.

Operation of the feed device 24, like operation of the other components of the apparatus 10, is controlled by means of a central electronic control device 30. However, as an alternative to the central control device 30, a plurality of separate control devices may be used. The control device 30 controls the operation of the two clamping apparatuses 26, 28 in such a way that the first clamping apparatus 26 is situated in its open position and is moved counter to the feed direction of the reinforcing fiber material 16 relative to the reinforcing fiber material 16 from its release position into its clamping position when the second clamping apparatus 28 is situated in its closed position and is moved in the feed direction F of the reinforcing fiber material 16 jointly with the reinforcing fiber material 16 from its clamping position into its release position.

Conversely, the first clamping apparatus 26 is situated in its closed position and is moved in the feed direction F of the reinforcing fiber material 16 jointly with the reinforcing fiber material 16 from its clamping position into its release position, when the second clamping apparatus 28 is situated in its open position and is moved counter to the feed direction F of the reinforcing fiber material 16 relative to the reinforcing fiber material 16 from its release position into its clamping position. This oppositely directed operation of the two clamping apparatuses 26, 28 is also illustrated in the schematic diagram in FIG. 2.

Figure 2:
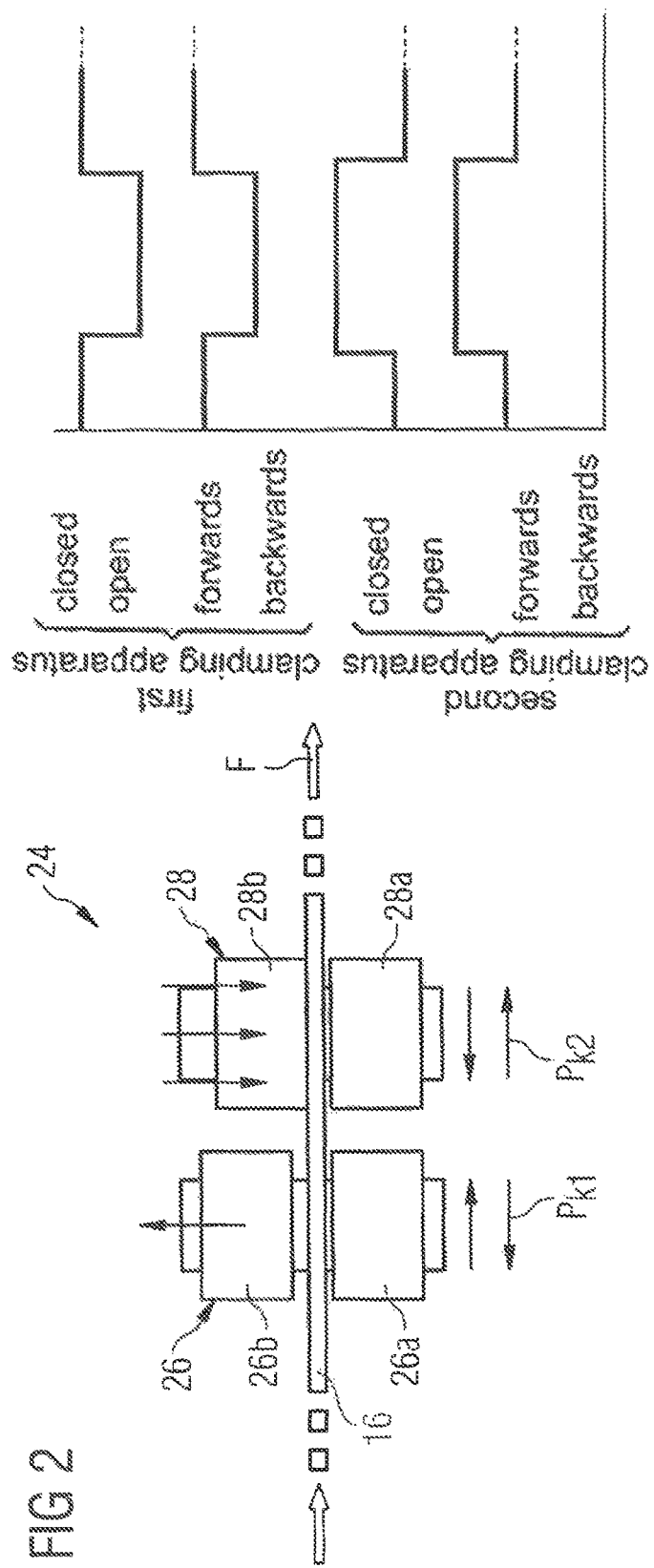
FIG. 2 shows a first variant of a feed device, which may be used in an apparatus for continuously manufacturing components from fiber reinforced composite materials according to FIG. 1.

As an alternative to the variant of a feed device 24 shown in FIG. 2, the feed device 24, as represented in FIG. 3, may also comprise two opposing conveyor belts 32, 34. The conveyor belts 32, 34 are movable in opposite directions and exert such a clamping force on a portion of the reinforcing fiber material 16 disposed between the conveyor belts 32, 34 that the reinforcing fiber material 16 is moved in its feed direction F by means of the conveying movement of the conveyor belts 32, 34. At least one of the conveyor belts 32, 34 is then preferably spring-mounted in order to compensate variations in the thickness of the reinforcing fiber material 16 that is to be fed through the apparatus 10 by means of the feed device 24.

The reinforcing fiber material 16 that is impregnated with a crosslinking plastics material in the impregnating device 22 is supplied by means of the feed device 24 to a shaping device 36. The shaping device 36 comprises a press 38, which comprises a first press element 40 and a second press element 42 lying opposite the first press element 40. In the press 38 shown in FIG. 1 the press elements 40, 42 are configured in each case in the form of press plates. If desired, the feed device 24 may be configured integrally with the shaping device 36. The press 38 of the shaping device 36 then forms one of the clamping apparatuses 26, 28 of the feed device 24, downstream or upstream of which lies the other clamping apparatus 28, 26, such as was described above in connection with FIG. 2. The press 38 forming a clamping apparatus and the other clamping apparatus 28, 26 may then be operated, as described above in connection with FIG. 2, in order to feed the reinforcing fiber material 16 through the apparatus 10. Alternatively, the press 38 may be configured in the form of a belt press comprising two conveyor belts lying opposite one another. The press may then likewise fulfil the dual function of, on the one hand, exerting pressure on the semi-finished product 16 supplied to the press 38 and, on the other hand, feeding the semi-finished product 16 through the apparatus 10. A configuration of the press 38 as a press comprising more than two press elements that presses on all sides is moreover conceivable.

As is evident from FIGS. 4A to D, the operation of the feed device 24 and the shaping device 36 is controlled by the control device 30 in such a way that the press elements 40, 42 of the press 38 are controlled into a closed position in order to exert pressure on the reinforcing fiber material 16 that is impregnated with plastics material, see arrow P1 in FIG. 4A. So long as the press elements 40, 42 are exerting pressure on the reinforcing fiber material 16, the press elements 40, 42 are moved jointly with the reinforcing fiber material 16 in the feed direction F of the reinforcing fiber material 16, see arrow P2 in FIG. 4B. The press elements 40, 42 are then controlled into an open position, see arrow P3 in FIG. 4C, and moved counter to the feed direction F of the semi-finished product, see arrow P4 in FIG. 4D, until the press elements 40, 42 are disposed in a position, in which they may be controlled once more into a closed position.

If desired, the apparatus 10 may further comprise a preheating device (not shown in FIG. 1), which is used to preheat the reinforcing fiber material 16 impregnated with a plastics material before it is supplied to the shaping device 36. Operation of the preheating device is preferably controlled in such a way that the viscosity of an impregnating material comprising a crosslinking plastics material increases, but as yet no substantial crosslinking reactions occur in the crosslinking plastics material. The preheating device may comprise, for example, a convection drying tunnel, an apparatus for exposing the reinforcing fiber woven fabric impregnated with a plastics material to electron beams or an infrared radiator.

The apparatus 10 further comprises a curing device 44, which is used to effect partial or complete curing of the crosslinking plastics material, with which the reinforcing fiber material 16 is impregnated. The curing device 44 may comprise, for example, a drying tunnel, an infrared radiator, an induction heating apparatus or a microwave heating apparatus. Operation of the curing device 44, i.e. operation of a heating device of the curing device 44, is preferably controlled by the control device 30 in such a way that the crosslinking plastics material, with which the reinforcing fiber material 16 is impregnated, is completely cured by the supply of heat to the heating device. If desired, however, only a partial curing of the plastics material may occur in the curing device 44.

Finally, a cutting apparatus 46 is provided, which cuts the semi-finished product removed from the curing device 44 to a desired length in order finally to produce the components 12. The cutting apparatus 46 may comprise, for example, a band saw, which is mounted movably so that it may be moved jointly with the semi-finished product to be cut in the feed direction F of the semi-finished product through the apparatus 10 in order to produce a cut running perpendicular to the feed direction F. The cutting apparatus 46 may further comprise a guiding- and/or retaining device (not shown in FIG. 1), which may be disposed, in relation to the feed direction F of the semi-finished product 10, upstream or downstream of the saw and may be used to prevent undesirable displacements of the semi-finished product or vibrations in the semi-finished product. The position of the guiding- and/or retaining device may be controlled by means of a control device 30 in dependence upon a varying shape of the semi-finished product that is to be cut.

FIGS. 5 to 9 show various embodiments of an impregnating tool 48 that may be used in the impregnating device 22 of the apparatus 10.

Figure 5:
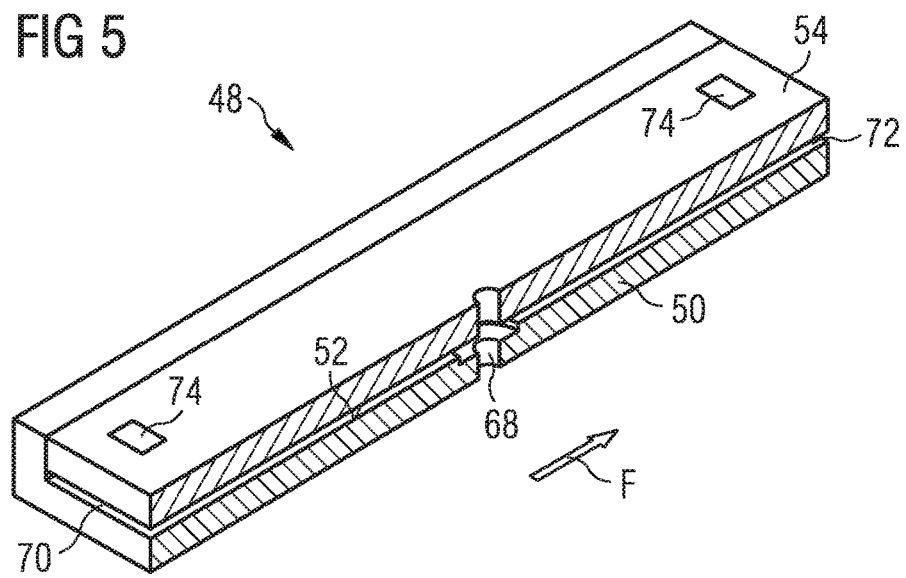
FIG. 5 shows a longitudinal sectional view of a first embodiment of an impregnating tool, which may be used in an impregnating device of the apparatus according to FIG. 1.
Figure 6:
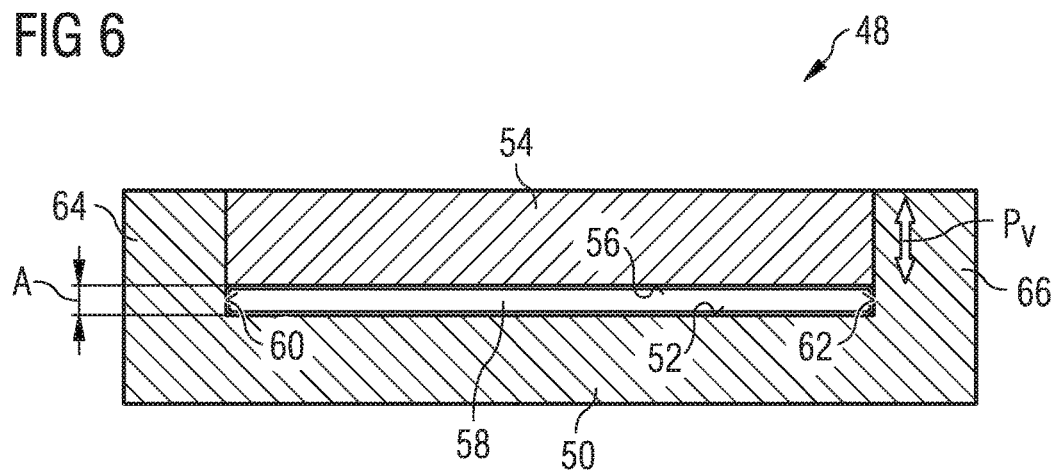
FIG. 6 shows a cross-sectional view of the impregnating tool according to FIG. 5.

In a first embodiment, which is shown in FIGS. 5 and 6, the impregnating tool 48 comprises a support element 50, which has a supporting face 52. A cover element 54 of the impregnating tool 48 is provided with a covering face 56, which faces the supporting face 52 of the support element 50 and is disposed at a distance A from the supporting face 52 of the support element 50. The supporting face 52 and the covering face 56 therefore delimit a receiving space 58. The receiving space 58 is moreover delimited by lateral faces 60, 26, which extend parallel to one another and perpendicular to the supporting face 52 and the covering face 56. In the impregnating tool 48 shown in FIGS. 5 and 6 the lateral faces 60, 62 are formed on lateral walls 64, 66, which are formed integrally with the support element 50. The distance A between the supporting face 52 of the support element 50 and the covering face 56 of the cover element 54 is constant in a direction perpendicular to the feed direction F of the reinforcing fiber material 16 through the receiving space 58 and parallel to a plane defined by the supporting face 52 and/or the covering face 56. In the variant of an impregnating tool 48 shown in FIGS. 5 and 6 the supporting face 52 and the covering face 56 are aligned parallel to one another.

The receiving space 58 is connected to an injection channel 68, through which a plastics material may be supplied into the receiving space 58. The receiving space 58 further has an inlet opening 70 and an outlet opening 72. During operation of the apparatus 10 the reinforcing fiber material 16, fed by the feed device 24, is supplied in a continuous process through the inlet opening 70 to the receiving space 58. While it is being fed through the receiving space 58, the reinforcing fiber material 16 is impregnated with the plastics material that is supplied to the receiving space 58 through the injection channel 68. Reinforcing fiber material 16 that is impregnated with the plastics material is subsequently continuously removed out of the outlet opening 72 of the receiving space 58, once again fed by the feed device 24.

The reinforcing fiber material 16 that is to be impregnated in the impregnating device 22 has a thickness that varies in the feed direction F of the reinforcing fiber material 16 through the apparatus 10. For example, the reinforcing fiber material 16 along the feed direction F of the reinforcing fiber material 16 through the apparatus 10 may comprise a varying number of reinforcing fiber woven fabric layers in order to meet mechanical requirements or design requirements that are demanded of the components 12 to be manufactured. The support element 50 and the cover element 54 of the impregnating tool 48 are therefore movable relative to one another in such a way that the distance A between the supporting face 52 of the support element 50 and the covering face 56 of the cover element 54 in the feed direction F of the reinforcing fiber material 16 is adaptable to a varying thickness of the reinforcing fiber material 16 that is fed in a continuous process through the receiving space 58. In this case, the distance A between the supporting face 52 of the support element 50 and the covering face 56 of the cover element 54 remains constant in a direction perpendicular to the feed direction F of the reinforcing fiber material 16 through the receiving space 58 and parallel to a plane defined by the supporting face 52 and/or the covering face 56, so that, viewed in the direction perpendicular to the feed direction F of the reinforcing fiber material 16 through the receiving space 58 and parallel to the plane defined by the supporting face 52 and/or the covering face 56, a uniform increase of the distance A is possible.

In the case of the impregnating tool 48 shown in FIGS. 5 and 6, the cover element 54 is of a plate-shaped construction and is accommodated between the lateral walls 64, 66 formed integrally with the support element 50. Thus, in order to vary the distance A between the supporting face 52 and the covering face 46 all that is required in the impregnating tool 48 according to FIGS. 5 and 6 is to move the support element 50 and the cover element 54 relative to one another in a direction perpendicular to the feed direction F of the reinforcing fiber material 16 through the receiving space 58 and perpendicular to a plane defined by the supporting face 52 and a plane defined by the covering face 56, see arrow PV in FIG. 6. The lateral faces 60, 26 formed on the lateral walls 64, 66 of the support element 50 in this case act as guiding faces, with the result that the parallel orientation of the supporting face 52 and the covering face 56 is maintained even in the event of a variation of the distance A between the supporting face 52 and the covering face 54.

In the region of the inlet opening 70 and the outlet opening 72 of the receiving space 58 the impregnating tool 48 is provided with a heating-/cooling device 74 that enables selective heating or cooling of the receiving space 58 in the region of the inlet opening 70 and outlet opening 72 thereof. The heating-/cooling device 74 comprises fluid channels, through which a heating- or cooling fluid may flow. By supplying cooling energy to the receiving space 58 the viscosity of the plastics material supplied to the receiving space 58 may, if need be, be increased. Supplying thermal energy to the receiving space 58, on the other hand, results in a partial or complete curing of the plastics material. Both an increase of the viscosity and an at least partial curing of the plastics material make it possible to minimize the leakage of plastics material from the receiving space 58.

Operation of the heating-/cooling device 74 is advantageous particularly in operating phases of the impregnating tool 48, in which portions of the reinforcing fiber material 16 that are of varying thickness are fed through the inlet opening 70 and the outlet opening 72 of the receiving space and the distance A between the supporting face 52 and the covering face 56 is adapted to the maximum thickness of the reinforcing fiber material 16, with the result that in the region of the inlet opening 70 or the outlet opening 72 of the receiving space 58 there is a gap between the reinforcing fiber material and the cover element 54.

Figure 7:
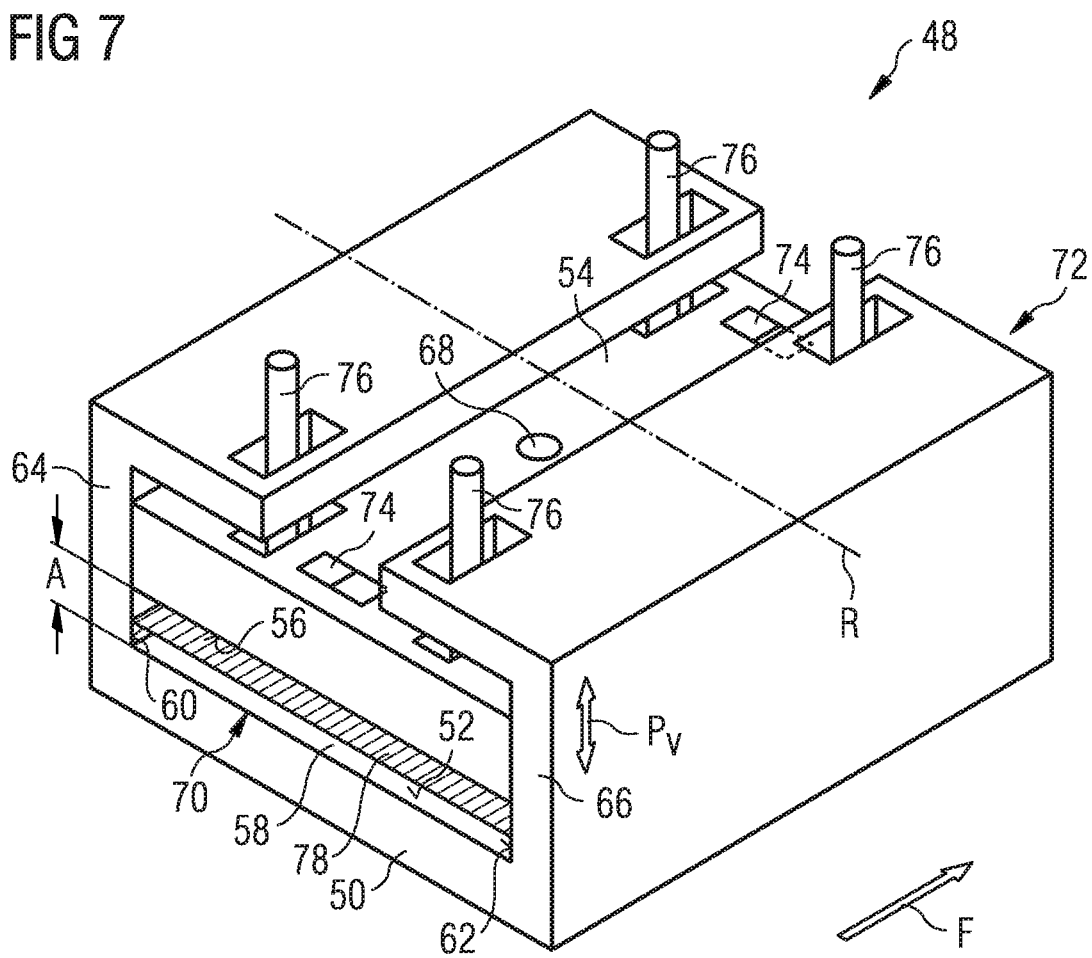
FIG. 7 shows a three-dimensional view of an alternative embodiment of an impregnating tool, which may be used in an impregnating device of the apparatus according to FIG. 1, FIGS. 8A and B show a three-dimensional view of a further alternative embodiment of an impregnating tool, which may be used in an impregnating device of the apparatus according to FIG. 1, and FIGS. 9A to D show a three-dimensional view of a further alternative embodiment of an impregnating tool, which may be used in an impregnating device of the apparatus according to FIG. 1.

The embodiment of an impregnating tool 48 that is shown in FIG. 7 differs from the arrangement according to FIGS. 5 and 6 in that the support element 50 and the cover element 54 are not only movable relative to one another perpendicular to the feed direction F of the reinforcing fiber material 16 through the receiving space 58, see arrow PV in FIG. 7, but are also pivotable relative to one another about an axis R that extends perpendicular to the feed direction F of the reinforcing fiber material 16 through the receiving space 58. In particular, the cover element 54 is pivotable about the axis R relative to the rigidly fixed support element 50. Thus, for example, the distance A between the supporting face 52 and the covering face 56 may be increased in the region of the inlet opening 70 of the receiving space 58 in order to allow a thicker portion of the reinforcing fiber material 16 to be received in the receiving space 58. At the same time, the pivoting of the cover element 54 may effect a reduction of the distance A between the supporting face 52 and the covering face 56 in the region of the outlet opening 72 of the receiving space 58. Thus, in the region of the outlet opening 72, through which a portion of the reinforcing fiber material 16 with a smaller thickness is still being fed, an escape of plastics material from the receiving space 58 may be prevented.

The cover element 54 is mounted by means of four hydraulic cylinders 76, which if need be may be actuated in order either merely to move the cover element 54 perpendicular to the feed direction F of the reinforcing fiber material 16 relative to the support element 50 and/or to pivot it about the axis R relative to the support element 50. In order to prevent a swiveling movement of the cover element 54 resulting in the reinforcing fiber material, which is being fed through the receiving space 58, becoming jammed between the support element 50 and the cover element 54 in the region of the inlet opening 70 or in the region of the outlet opening 72, the cover element 54 is always positioned in such a way relative to the support element 50 that the distance A between the supporting face 52 and the covering face 56 is greater than a maximum thickness of the reinforcing fiber material 16 fed through the receiving space 58. For this reason, on the cover element 54 in the region of the inlet opening 70 and the outlet opening 72 of the receiving space 58 in each case a sealing element 78 is provided. The sealing element 78 seals off the gap that exists during operation of the impregnating tool 48 between the reinforcing fiber material 16 and the cover element 54 in the region of the inlet opening 70 and the outlet opening 72 of the receiving space 58 and hence prevents a leakage of plastics material from the receiving space 58.

Alternatively, however, the axis R may be configured in the form of a virtual, non-fixed axis. The relative swiveling movement of the support element 50 and the cover element 54 is then realized by means of appropriate independent activation of the hydraulic cylinders 76. Thus, for example, the distance A between the supporting face 52 and the covering face 56 may be varied in the region of the inlet opening 70, while the distance A between the supporting face 52 and the covering face 56 remains constant in the region of the outlet opening 72, or the other way round. Otherwise the structure and mode of operation of the impregnating tool 48 according to FIG. 7 correspond to the structure and mode of operation of the arrangement according to FIGS. 5 and 6.

Figure 8A:
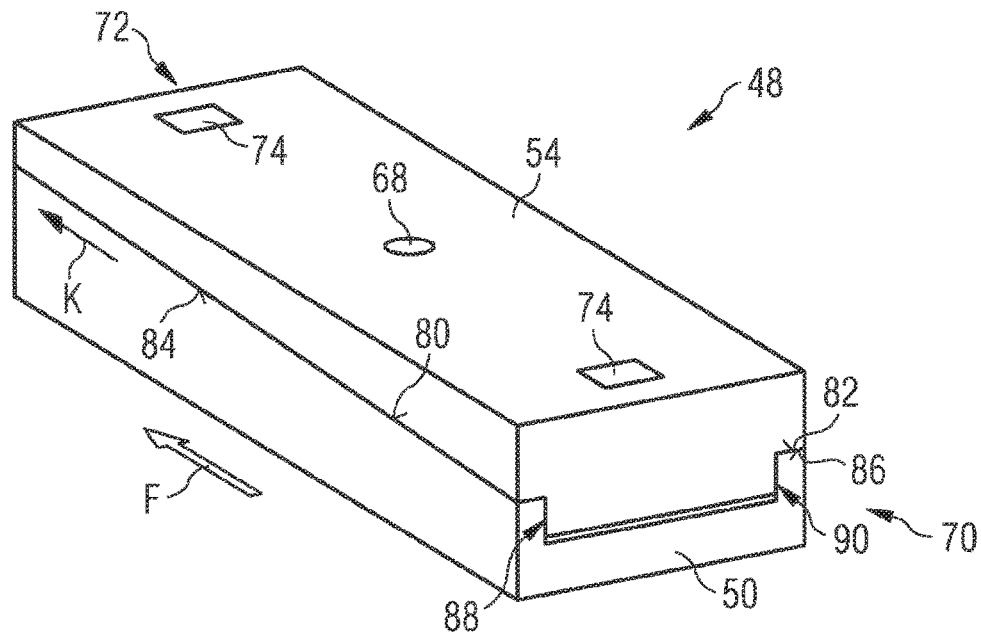
Figure 8B:
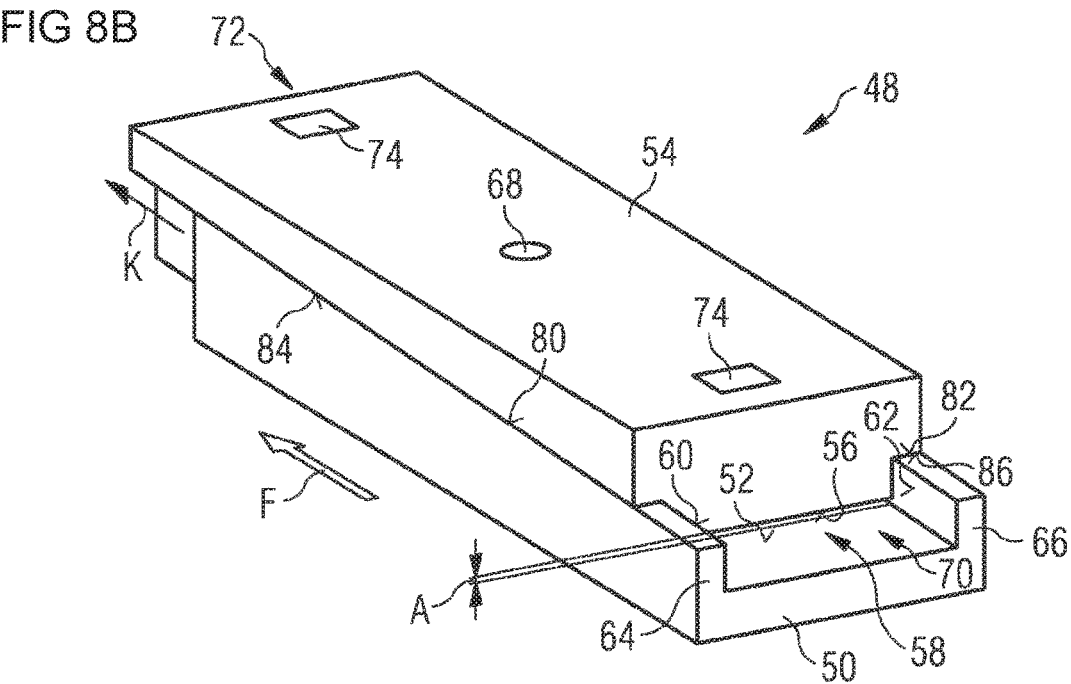

FIGS. 8A and B show a variant of an impregnating tool 48, in which the support element 50 comprises two contact faces 80, 82, which along the feed direction F of the reinforcing fiber material 16 through the receiving space 58 are inclined relative to the supporting face 52 and interact with complementary contact faces 84, 86 formed on the cover element 54. The contact faces 80, 82 of the support element 50 are formed by surfaces, facing the cover element 54, of the lateral walls 64, 66 formed integrally with the support element 50. The contact faces 84, 86 of the cover element 54 on the other hand are formed by surfaces, facing the support element 50, of two recesses 88, 90 that are formed in mutually opposite outer faces of the cover element 50.

In order, in the impregnating tool 48 according to FIGS. 8A and B, to vary the distance A between the supporting face 52 and the covering face 56 and consequently adapt the distance A to a varying thickness of the reinforcing fiber material 16 fed in a continuous process through the receiving space 58, the support element 50 and the cover element 54 are moved relative to one another in a direction parallel to the contact faces 80, 82, 84, 60, see arrow K in FIGS. 8A and B. The relative displacement between the support element 50 and the cover element 54 is in this case guided by the interaction of the contact faces 80, 82, 84, 86, with the result that the orientation of the supporting face 52 and the covering face 56 relative to one another is maintained.

The contact faces 80, 82 formed on the support element 50 form with the supporting face 52 an angle of inclination, which corresponds to an angle of inclination that the contact faces 84, 86 formed on the cover element 54 form with the covering face 56. This development ensures that a parallel alignment of the supporting face 52 and the covering face 56 is maintained even if the distance A between the supporting face 52 and the covering face 56 is varied by means of the previously described relative displacement of the support element 50 and the cover element 54 along the contact faces 89, 82, 84, 86. Otherwise the structure and mode of operation of the impregnating tool 48 according to FIG. 8 correspond to the structure and mode of operation of the arrangement according to FIGS. 5 and 6.

Finally FIGS. 9A to D show a variant of an impregnating tool, in which the support element 50 comprises a first support-element sealing portion 92, which is disposed in the region of the inlet opening 70 of the receiving space 58, as well as a second support-element sealing portion 94, which is disposed in the region of the outlet opening 72 of the receiving space 58. The support element 50 further comprises a support-element central portion 96, which is disposed between the first and the second support-element sealing portion 52, 54. In a similar fashion the cover element 54 in the region of the inlet opening 70 of the receiving space 58 comprises a first cover-element sealing portion 98. In the region of the outlet opening 72 of the receiving space 58 the cover element 54 is provided with a second cover-element sealing portion 100. Finally, the cover element 54 comprises a cover-element central portion 102, which is disposed between the first and the second cover-element sealing portion 98, 100.

Formed on each of the support-element sealing portions 92, 94 is a supporting-face end portion 52a, 52b, which delimits the receiving space 58 in the region of the inlet opening 70 and/or in the region of the outlet opening 72. On the support-element central portion 96, on the other hand, a supporting-face central portion 52c is formed, which delimits the receiving space 58 in a central region. In a similar fashion, on each of the cover-element sealing portions 98, 100 a covering-face end portion 56a, 56b is formed, which delimits the receiving space 58 in the region of the inlet opening 70 and/or in the region of the outlet opening 72. On the cover-element central portion 102, on the other hand, a covering-face central portion 56c is formed, which delimits the receiving space 58 in a central region.

Formed on each of the support-element sealing portions 92, 94 is a support-element guiding face 104, 106, which along the feed direction F of the reinforcing fiber material 16 through the receiving space 58 is inclined relative to the corresponding supporting-face end portion 52a, 52b and interacts with a complementary support-element guiding face 108, 110 that is formed on the support-element central portion 96. In a similar fashion, on each of the cover-element sealing portions 98, 100 a cover-element guiding face 112, 114 is formed, which along the feed direction F of the reinforcing fiber material 16 through the receiving space 58 is inclined relative to the respective covering-face end portions 56a, 56b and interacts with a complementary cover-element guiding face 116, 118 that is formed on the cover-element central portion.

As a comparison of FIGS. 9A and 9B reveals, the support-element sealing portions 92, 94 and the support-element central portion 96 by means of a relative displacement in a direction parallel to the support-element guiding faces 104, 106, 108, 110 are movable in such a way relative to one another that between the supporting-face end portions 52a, 52b and the covering-face end portions 56a, 56c a distance A1, A3 is adjustable, which differs from one another and from a distance A2 between the supporting-face central portion 52c and the covering-face central portion 56c. In a corresponding manner the cover-element sealing portions 98, 100 and the cover-element central portion 102 by means of a relative displacement in a direction parallel to the cover-element guiding faces 112, 114, 116, 118 are movable in such a way relative to one another that between the covering-face end portions 56a, 56b and the supporting-face end portions 52a, 52b a distance A1, A3 is adjustable, which differs from one another and from a distance A2 between the covering-face central portion 56c and the supporting-face central portion 52c.

If a portion of the reinforcing fiber material 16 of increased thickness is to be supplied to the receiving space 58 through the inlet opening 70, see FIG. 9B, the first support-element sealing portion 92 is displaced relative to the support-element central portion 96 in the direction of the arrow V1 parallel to the mutually interacting support-element guiding faces 104, 108. At the same time, the first cover-element sealing portion 98 is displaced relative to the cover-element central portion 102 in the direction of the arrow V2 parallel to the mutually interacting cover-element guiding faces 112, 116, see FIG. 9B. In this way the distance A1 between the supporting-face end portion 52a and the covering-face end portion 56a may be adapted to the increased thickness of the reinforcing fiber material 16 that is being supplied to the receiving space 58 through the inlet opening 70, while the distance A2 between the supporting-face central portion 52c and the covering-face central portion 56c may continue to be kept adapted to the smaller thickness of the portion of the reinforcing fiber material 16 being fed through said region of the receiving space 58.

When the reinforcing fiber material 16 is fed further through the receiving space 58 so that its portion of greater thickness also passes through the central region of the receiving space 58, the distance A2 between the supporting-face central portion 52c and the covering-face central portion 56c is increased until it corresponds to the distance A1 between the supporting-face end portion 52a and the covering-face end portion 56a. For this purpose, the support-element central portion 96 is moved in the direction of the arrow V3 parallel to the support-element guiding faces 104, 106, 108, 110 relative to the two support-element sealing portions 92, 94. In a corresponding manner the cover-element central portion 102 is moved in the direction of the arrow V4 parallel to the cover-element guiding faces 112, 114, 116, 118 relative to the two cover-element sealing portions 98, 100.

When the portion of the reinforcing fiber material 16 of increased thickness finally reaches the region of the outlet opening 72 of the receiving space 58, the distance A3 between the supporting-surface end portion 52b and the covering-face end portion 56b is also increased until it corresponds to the distances A1 between the supporting-face end portion 52a and the covering-face end portion 56a and the distance A2 between the supporting-face central portion 52c and the covering-face central portion 56c. For this purpose, the second support-element sealing portion 94 is moved in the direction of the arrow V5 relative to the support-element central portion 96 in a direction parallel to the support-element guiding faces 106, 110. In a similar fashion the second cover-element sealing portion 100 is moved in the direction of the arrow V6 relative to the cover-element central portion 102 parallel to the cover-element guiding faces 114, 118.

The support-element guiding faces 104, 106, 108, 110 formed on the support-element sealing portions 94, 96 and the support-element central portion 96 form with the supporting-face end portions 52a, 52b and/or the supporting-face central portion 52c an angle of inclination, which corresponds to an angle of inclination that the cover-element guiding faces 112, 114, 116, 118 formed on the cover-element sealing portions 98, 100 and the cover-element central portion 102 form with the covering-face end portions 56a, 56b and/or the covering-face central portion 56c. This development ensures that the relative, i.e., the parallel orientation of the supporting-face portions 52a, 52b, 52c relative to the covering-face portions 56a, 56b, 56c is maintained even if the distances A1, A2, A3 between the supporting-face portions 52a, 52b, 52c and the covering-face portions 56a, 56b, 56c are varied.

By virtue of the development of the impregnating tool 48 shown in FIGS. 9A to D, the leakage of plastics material from the receiving space 58 may be minimized since the distances A1, A3 between the supporting-face end portions 52a, 52b and the covering-face end portions 56a, 56b may be adapted optimally to a varying thickness of the reinforcing fiber material independently of one another and independently of the distance A2 between the supporting-face central portion 52c and the covering-face central portion 56c. Otherwise the structure and mode of operation of the impregnating tool 48 according to FIGS. 9A to D correspond to the structure and mode of operation of the arrangement according to FIGS. 5 and 6.

Although various features of the invention have been described here with reference to specific embodiments of an impregnating tool 48, these features may be combined in any desired manner with one another. For example, all of the embodiments of an impregnating tool 48 may comprise sealing elements 78, such as were described in connection with the impregnating tool 48 shown in FIG. 7, equally all of the impregnating tools 48 may comprise a heating-/cooling device 74 such as described in connection with the impregnating tool 48 according to FIGS. 5 and 8.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An impregnating tool for impregnating a reinforcing fiber material with a plastics material, comprising:
 a support element, comprising a supporting face,
 a cover element, comprising a covering face that faces the supporting face of the support element and is disposed at a distance from the supporting face of the support element, and a receiving space, delimited by the supporting face of the support element and the covering face of the cover element, being connected to an injection channel for supplying the plastics material into the receiving space and comprising an inlet opening for supplying the reinforcing fiber material into the receiving space in a continuous process as well as an outlet opening for removing reinforcing fiber material impregnated with the plastics material from the receiving space in a continuous process, wherein a distance between the supporting face of the support element and the covering face of the cover element is constant in a direction perpendicular to a feed direction of the reinforcing fiber material through the receiving space and parallel to a plane defined by at least one of the supporting face and the covering face, and wherein the support element and the cover element are movable in such a way relative to one another that the distance between the supporting face of the support element and the covering face of the cover element in the feed direction of the reinforcing fiber material through the receiving space is adaptable to a varying thickness of the reinforcing fiber material fed in a continuous process through the receiving space, wherein the support element and the cover element are pivotable relative to one another about an axis, which extends perpendicular to the feed direction of the reinforcing fiber material through the receiving space and parallel to a plane defined by at least one of the supporting face and the covering face, in order to adapt the distance between the supporting face of the support element and the covering face of the cover element to a varying thickness of the reinforcing fiber material fed in a continuous process through the receiving space.

2. The impregnating tool according to claim 1, wherein the support element and the cover element are movable relative to one another in a direction perpendicular to the feed direction of the reinforcing fiber material through the receiving space and perpendicular to a plane defined by at least one of the supporting face and the covering face in order to adapt the distance between the supporting face of the support element and the covering face of the cover element to a varying thickness of the reinforcing fiber material fed in a continuous process through the receiving space, wherein the cover element or the support element is in particular of a plate-shaped construction and is accommodated between lateral walls formed on the support element or the cover element.

3. The impregnating tool according to claim 1, wherein on the support element at least one contact face is formed, which along the feed direction of the reinforcing fiber material through the receiving space, is inclined relative to the supporting face and interacts with a complementary contact face formed on the cover element, wherein the support element and the cover element are movable relative to one another in a direction parallel to the contact faces in order to adapt the distance between the supporting face of the support element and the covering face of the cover element to a varying thickness of the reinforcing fiber material fed in a continuous process through the receiving space.

4. The impregnating tool according to claim 3, wherein the contact face formed on the support element forms with the supporting face an angle of inclination, which corresponds to an angle of inclination that the contact face formed on the cover element forms with the covering face.

5. The impregnating tool according to claim 3, wherein the contact face formed on the support element is disposed in a region that is at least one of
    facing the cover element, of a lateral wall of the support element and interacts with a contact face, which is formed on the cover element and disposed in a region, facing the support element, of a recess provided in particular in an outer face of the cover element, and
    facing the support element, of a lateral wall of the cover element and interacts with a contact face, which is formed on the support element and disposed in a region, facing the cover element, of a recess provided in particular in an outer face of the support element.

6. The impregnating tool according to claim 1, wherein at least one of
    in the region of the inlet opening of the receiving space at least one sealing element is provided, which is configured to effect sealing of a gap between the reinforcing fiber material, which is fed to the receiving space through the inlet opening, and at least one of the support element and the cover element, and
    in the region of the outlet opening of the receiving space at least one sealing element is provided, which is configured to effect sealing of a gap between the reinforcing fiber material, which is impregnated with the plastics material and is removed from the receiving space through the outlet opening, and at least one of the support element and the cover element.

7. The impregnating tool according to claim 1, wherein in the region of at least one of the inlet opening and the outlet opening of the receiving space at least one of a heating device and a cooling device is provided for at least one of heating and cooling the reinforcing fiber material impregnated with the plastics material.

8. The impregnating tool according to claim 1, wherein at least one of
    the support element comprises at least one support-element sealing portion, which is disposed in the region of at least one of the inlet opening and the outlet opening of the receiving space, as well as a support-element central portion, wherein on each support-element sealing portion a supporting-face end portion is formed, which delimits the receiving space in the region of the at least one of inlet opening and the outlet opening, and on the support-element central portion a supporting-face central portion is formed, and wherein the support-element sealing portion and the support-element central portion are movable in such a way relative to one another that between the supporting-face end portion formed on the support-element sealing portion and the covering face a first distance is adjustable, which is adapted to a varying thickness of the reinforcing fiber material fed in a continuous process through the receiving space and differs from a second distance between the supporting-face central portion and the covering face that is adapted to a varying thickness of the reinforcing fiber material fed in a continuous process through the receiving space, and
    the cover element comprises at least one cover-element sealing portion, which is disposed in the region of at least one of the inlet opening and the outlet opening of the receiving space, as well as a cover-element central portion, wherein on each cover-element sealing portion a covering-face end portion is formed, which delimits the receiving space in the region of at least one of the inlet opening and the outlet opening, and on the cover-element central portion a covering-face central portion is formed, and wherein the cover-element sealing portion and the cover-element central portion are movable in such a way relative to one another that between the covering-face end portion formed on the cover-element sealing portion and the supporting face a first distance is adjustable, which is adapted to a varying thickness of the reinforcing fiber material fed in a continuous process through the receiving space and differs from a second distance between the covering-face central portion and the supporting face that is adapted to a varying thickness of the reinforcing fiber material fed in a continuous process through the receiving space.

9. The impregnating tool according to claim 8, wherein at least one of
  on the support-element sealing portion, a support-element guiding face is formed, which along the feed direction of the reinforcing fiber material through the receiving space is inclined relative to the supporting-face end portion formed on the support-element sealing portion and interacts with a complementary support-element guiding face formed on the support-element central portion, wherein the support-element sealing portion and the support-element central portion are movable relative to one another in a direction parallel to the support-element guiding faces in order to vary the first distance between the supporting-face end portion formed on the support-element sealing portion and the covering face relative to the second distance between the supporting-face central portion and the covering face, and
  on the cover-element sealing portion, a cover-element guiding face is formed, which along the feed direction of the reinforcing fiber material through the receiving space is inclined relative to the covering-face end portion formed on the cover-element sealing portion and interacts with a complementary cover-element guiding face formed on the cover-element central portion, wherein the cover-element sealing portion and the cover-element central portion are movable relative to one another in a direction parallel to the cover-element guiding faces in order to vary the first distance between the covering-face end portion formed on the cover-element sealing portion and the supporting face relative to the second distance between the covering-face central portion and the supporting face.

10. A method of impregnating a reinforcing fiber material with a plastics material, comprising:
  providing an impregnating tool having
    a support element, which comprises a supporting face,
    a cover element, which comprises a covering face that faces the supporting face of the support element and is disposed at a distance from the supporting face of the support element, and
    a receiving space delimited by the supporting face of the support element and the covering face of the cover element,
  supplying the reinforcing fiber material into the receiving space through an inlet opening of the receiving space in a continuous process,
  supplying the plastics material into the receiving space through an injection channel connected to the receiving space and
  removing reinforcing fiber material impregnated with the plastics material from the receiving space through an outlet opening of the receiving space in a continuous process,
  wherein a distance between the supporting face of the support element and the covering face of the cover element is constant in a direction perpendicular to a feed direction of the reinforcing fiber material through the receiving space and parallel to a plane defined by at least one of the supporting face and the covering face and
  wherein the support element and the cover element are moved in such a way relative to one another that the distance between the supporting face of the support element and the covering face of the cover element in the feed direction of the reinforcing fiber material through the receiving space is adapted to a varying thickness of the reinforcing fiber material fed in a continuous process through the receiving space,
  wherein the support element and the cover element are pivoted relative to one another about an axis, which extends perpendicular to the feed direction of the reinforcing fiber material through the receiving space and parallel to a plane defined by at least one of the supporting face and the covering face, in order to adapt the distance between the supporting face of the support element and the covering face of the cover element to a varying thickness of the reinforcing fiber material fed in a continuous process through the receiving space.

11. The method according to claim 10, wherein the support element and the cover element are moved relative to one another in a direction perpendicular to the feed direction of the reinforcing fiber material through the receiving space and perpendicular to a plane defined by at least one of the supporting face and the covering face in order to adapt the distance between the supporting face of the support element and the covering face of the cover element to a varying thickness of the reinforcing fiber material fed in a continuous process through the receiving space.

12. The method according to claim 10, wherein on the support element at least one contact face is formed, which along the feed direction of the reinforcing fiber material through the receiving space is inclined relative to the supporting face and interacts with a complementary contact face formed on the cover element, wherein the support element and the cover element are moved relative to one another in a direction parallel to the contact faces in order to adapt the distance between the supporting face of the support element and the covering face of the cover element to a varying thickness of the reinforcing fiber material fed in a continuous process through the receiving space.

13. The method according to claim 10, wherein at least one of
  the support element comprises at least one support-element sealing portion, which is disposed in the region of at least one of the inlet opening and the outlet opening of the receiving space, as well as a support-element central portion, wherein on each support-element sealing portion a supporting-face end portion is formed, which delimits the receiving space in the region of at least one of the inlet opening and the outlet opening, and on the support-element central portion a supporting-face central portion is formed, and wherein the support-element sealing portion and the support-element central portion are moved in such a way relative to one another that between the supporting-face end portion formed on the support-element sealing portion and the covering face a first distance is adjusted, which is adapted to a varying thickness of the reinforcing fiber material fed in a continuous process through the receiving space and differs from a second distance between the supporting-face central portion and the covering face that is adapted to a varying thickness of the reinforcing fiber material fed in a continuous process through the receiving space, and the cover element comprises at least one cover-element sealing portion, which is disposed in the region of at least one of the inlet opening and the outlet opening of the receiving space, as well as a cover-element central portion, wherein on each cover-element sealing portion a covering-face end portion is formed, which delimits the receiving space in the region of at least one of the inlet opening and the outlet opening, and on the cover-element central portion a covering-face central portion is formed, and wherein the cover-element sealing portion and the cover-element central portion are moved in such a way relative to one another that between the covering-face end portion formed on the cover-element sealing portion and the supporting face a first distance is adjusted, which is adapted to a varying thickness of the reinforcing fiber material fed in a continuous process through the receiving space and differs from a second distance between the covering-face central portion and the supporting face that is adapted to a varying thickness of the reinforcing fiber material fed in a continuous process through the receiving space.

14. The method according to claim 13, wherein at least one of on the support-element sealing portion a support-element guiding face is formed, which along the feed direction of the reinforcing fiber material through the receiving space is inclined relative to the supporting-face end portion formed on the support-element sealing portion and interacts with a complementary support-element guiding face formed on the support-element central portion, wherein the support-element sealing portion and the support-element central portion are moved relative to one another in a direction parallel to the support-element guiding faces in order to vary the first distance between the supporting-face end portion formed on the support-element sealing portion and the covering face relative to the second distance between the supporting-face central portion and the covering face, and on the cover-element sealing portion a cover-element guiding face is formed, which along the feed direction of the reinforcing fiber material through the receiving space is inclined relative to the covering-face end portion formed on the cover-element sealing portion and interacts with a complementary cover-element guiding face formed on the cover-element central portion, wherein the cover-element sealing portion and the cover-element central portion are moved relative to one another in a direction parallel to the cover-element guiding faces in order to vary the first distance between the covering-face end portion formed on the cover-element sealing portion and the supporting face relative to the second distance between the covering-face central portion and the supporting face.

15. An apparatus for continuously manufacturing components from fiber reinforced composite materials comprising:

a feed device, which is configured to feed a semi-finished product containing reinforcing fibers through the apparatus, and an impregnating device, which comprises an impregnating tool for impregnating a reinforcing fiber material with a plastics material, comprising:

a support element, comprising a supporting face, a cover element, comprising a covering face that faces the supporting face of the support element and is disposed at a distance from the supporting face of the support element, and a receiving space, delimited by the supporting face of the support element and the covering face of the cover element, being connected to an injection channel for supplying the plastics material into the receiving space and comprising an inlet opening for supplying the reinforcing fiber material into the receiving space in a continuous process as well as an outlet opening for removing reinforcing fiber material impregnated with the plastics material from the receiving space in a continuous process, wherein a distance between the supporting face of the support element and the covering face of the cover element is constant in a direction perpendicular to a feed direction of the reinforcing fiber material through the receiving space and parallel to a plane defined by at least one of the supporting face and the covering face, wherein the support element and the cover element are movable in such a way relative to one another that the distance between the supporting face of the support element and the covering face of the cover element in the feed direction of the reinforcing fiber material through the receiving space is adaptable to a varying thickness of the reinforcing fiber material fed in a continuous process through the receiving space, and wherein the support element and the cover element are pivotable relative to one another about an axis, which extends perpendicular to the feed direction of the reinforcing fiber material through the receiving space and parallel to a plane defined by at least one of the supporting face and the covering face, in order to adapt the distance between the supporting face of the support element and the covering face of the cover element to a varying thickness of the reinforcing fiber material fed in a continuous process through the receiving space.

* * * * *